(12) United States Patent
Patel et al.

(10) Patent No.: US 11,157,396 B2
(45) Date of Patent: *Oct. 26, 2021

(54) STATELESS SELF-SUFFICIENT TEST AGENTS

(71) Applicant: salesforce.com, inc., San Francisco, CA (US)

(72) Inventors: Ashish Patel, Fremont, CA (US); Christopher Tammariello, San Mateo, CA (US); Michael Bartoli, San Francisco, CA (US); Tuhin Kanti Sharma, San Mateo, CA (US); Vaishali Nandal, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/703,070

(22) Filed: Dec. 4, 2019

(65) Prior Publication Data

US 2020/0104250 A1    Apr. 2, 2020

Related U.S. Application Data

(63) Continuation of application No. 15/685,964, filed on Aug. 24, 2017, now Pat. No. 10,534,698.

(51) Int. Cl.
*G06F 11/36* (2006.01)

(52) U.S. Cl.
CPC ...... *G06F 11/3688* (2013.01); *G06F 11/3664* (2013.01)

(58) Field of Classification Search
CPC ............ G06F 11/3688; G06F 11/3664; G06F 11/3612; G06F 11/3684
See application file for complete search history.

(56) References Cited

U.S. PATENT DOCUMENTS

| 6,620,204 B1 | 9/2003 | Malcolm |
|---|---|---|
| 7,055,137 B2 | 5/2006 | Mathews |
| (Continued) | | |

OTHER PUBLICATIONS

Jairo Pava et al., "A Self-Configuring Test Harness for Web Applications", [Online], pp. 1-6, [Retrieved from Internet on Jun. 23, 2021], <https://dl.acm.org/doi/pdf/10.1145/1566445.1566533> (Year: 2009).*

(Continued)

*Primary Examiner* — Ziaul A Chowdhury
(74) *Attorney, Agent, or Firm* — Wong & Rees LLP; Zhichong Gu (57) ABSTRACT

A web server, such as one operating with a test agent in a database system receives a request for executing a test. The request is sent by a test master to an endpoint of the web server. In response to receiving the request by the web server, without exchanging information between the test agent and the test master, the test agent performs a series of operations as follows. A complete set of test steps is determined for the test. A complete set of test data used to execute the complete set of test steps is determined. The complete set of test steps for the test is executed with the complete set of test data. A final test execution status is generated for the test. The test agent can make the final test execution status for the test available for the test master to retrieve by way of the web server.

20 Claims, 6 Drawing Sheets

(56) References Cited

U.S. PATENT DOCUMENTS

| | | | |
|---|---|---|---|
| 8,856,594 B2 * | 10/2014 | Kurapati | G06F 11/2294 714/27 |
| 8,966,446 B1 | 2/2015 | Amacker et al. | |
| 9,274,935 B1 | 3/2016 | Lachwani et al. | |
| 10,223,239 B1 | 3/2019 | Ghanbaran et al. | |
| 2002/0028430 A1 | 3/2002 | Driscoll et al. | |
| 2005/0172271 A1 | 8/2005 | Spertus et al. | |
| 2006/0020699 A1 | 1/2006 | D'Esposito | |
| 2008/0104575 A1 | 5/2008 | Fan et al. | |
| 2008/0109680 A1 | 5/2008 | Kodaka et al. | |
| 2009/0055686 A1 | 2/2009 | Tsang | |
| 2009/0082008 A1 | 3/2009 | Thorell | |
| 2010/0192220 A1 | 7/2010 | Heizmann et al. | |
| 2010/0306595 A1 | 12/2010 | Murata et al. | |
| 2010/0332904 A1 * | 12/2010 | Bloching | G06F 11/2294 714/32 |
| 2012/0265824 A1 | 10/2012 | Lawbaugh | |
| 2012/0290920 A1 | 11/2012 | Crossley | |
| 2013/0067298 A1 | 3/2013 | Li et al. | |
| 2013/0132774 A1 | 5/2013 | Somendra | |
| 2013/0139130 A1 | 5/2013 | Anjan et al. | |
| 2013/0318402 A1 * | 11/2013 | Rapp | G06F 11/3672 714/38.1 |
| 2014/0068325 A1 | 3/2014 | Masser et al. | |
| 2014/0215443 A1 | 7/2014 | Voccio et al. | |
| 2015/0057961 A1 | 2/2015 | Montoya et al. | |
| 2018/0210822 A1 * | 7/2018 | Saginaw | G06F 11/3684 |
| 2019/0034325 A1 | 1/2019 | Yokoyama et al. | |
| 2019/0065352 A1 | 2/2019 | Patel et al. | |

OTHER PUBLICATIONS

Juhan Emits et al., "Model-Based Testing of Web Applications Using NModel", [Online], pp. 211-216, [Retrieved from Internet on Jun. 23, 2021], <https://link.springer.com/content/pdf/10.1007/978-3-642-05031-2_14.pdf> (Year: 2009).*

Naouel Moha et al., "Towards a Platform for Usability Remote Tests via Internet", [Online], pp. 1-5, [Retrieved from Internt on Jun. 23, 2021], <http://citeseerx.ist.psu.edu/viewdoc/download?doi=10.1.1.182.4310&rep=rep1&type=pdf>, (Year: 2004).*

Dan Tao et al., "Cloud Platform Based Automated Security Testing System for Mobile Internet", [Online], pp. 537-544, [Retrieved from Internet on Jun. 23, 2021], <https://ieeexplore.ieee.org/stamp/stamp.jsp?arnumber=7349926> (Year: 2015).*

United States Patent and Trademark Office, U.S. Appl. No. 15/685,964, Final Office Action dated May 21, 2019.

United States Patent and Trademark Office, U.S. Appl. No. 15/685,964, Non-Final Office Action dated Nov. 16, 2018.

United States Patent and Trademark Office, U.S. Appl. No. 15/685,964, Notice of Allowance dated Sep. 9, 2019.

* cited by examiner

STATELESS SELF-SUFFICIENT TEST AGENTS

CROSS-REFERENCE TO RELATED APPLICATIONS

This application is a Continuation of U.S. patent application Ser. No. 15/685,964 filed on Aug. 24, 2017, the contents of which are incorporated herein by reference in their entireties. The applicant(s) hereby rescind any disclaimer of claim scope in the parent application(s) or the prosecution history thereof and advise the USPTO that the claims in this application may be broader than any claim in the parent application(s).

TECHNICAL FIELD

The present invention relates generally to test execution, and in particular, to stateless self-sufficient test agents.

BACKGROUND

A computing system that processes massive volumes of transactions and interactions may comprise numerous software and hardware components distributed across a large number of computing nodes and networks. To verify that the system performs correctly and responsively, extensive and sophisticated testing need to be performed against some or all the components in the system regularly, on demand, or in development.

Typically, specific test code is written in various programming languages such as JAVA, C#, C++, etc., to support specific test cases against a system under test. If the system is developed by many developers and used by many users, the test code need to be designed, written and itself tested over and over again through tightly coupled cooperative and handholding efforts involving numerous people, organizations, and development teams. As the system evolves over time with new features, new components and new bug fixes, test code development efforts, preparing test data, coordinating different stakeholders in testing, and so forth, can consume significant personnel and non-personnel resources.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1.0. General Overview
2.0. Functional Overview
   2.1. Test Tools and Proxy Agents
   2.2. Stateless Text Execution Framework
   2.3. RESTful Endpoints
   2.4. Test Definition Data and Test Data
   2.5. Resiliency and Robustness
3.0. Example Embodiments
4.0 Implementation Mechanism—Hardware Overview
5.0. Extensions and Alternatives

1.0 GENERAL OVERVIEW

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Under other approaches that do not implement techniques as described herein, test tools are specifically designed and developed to exercise or test a system. For a cloud-based computing system that includes web-based functionality, the test tools may have web-client-side components and web-server-side components that interact with one another as well as with other computing resources such as other software and hardware components, network and data connections, configuration data, databases, etc., across some or all tiers of the cloud computing system. When a test case is being executed with a test tool at runtime, the web-client-side components and the web-server-side components of the test tool exchange test data and test execution state information and jointly control the execution path of the test case. If a web-client-side or web-server-side component of the test tool encounters a problem, other web-client-side or web-server-side components of the test tool may also be adversely impacted as a result, thereby causing the entire test case to fail or otherwise not to complete properly.

To test newly added or modified web-based functionality, typically software code for the web-client-side or web-server-side components of the test tool need to be specifically developed, modified, or rewritten. It can be laborintensive and error-prone to try to keep the test tools updated and in correct working order at all time.

Under techniques as described herein, a resilient and scalable infrastructure can be used to test a system. Even if the system represents a complicated computing system such as a cloud-based computing system that supports massive volumes of concurrent and sequential transactions and interactions, the infrastructure as described herein can be used to avoid writing customized test code that consumes significant resources to develop and maintain. In addition, the infrastructure can be used to test systems in development as well as in production.

With this resilient testing infrastructure, test cases involving diverse types of tests and diverse types of test subjects can be easily developed/created with a data description language or a data interchange format such as JavaScript Object Notation (JSON), a XML file, a flat file database, etc., without any need to write test tool code for these test cases in a programming language such as JAVA, C#, C++, etc.

Under techniques as described herein, test cases (as defined/specified with test definition data) and test data (e.g., initial test data, etc.) such as those against a database system can be directly represented in a human readable file such as a JSON file, a XML file, a flat file database, etc. As a result, an authorized user, whether from a sophisticated development team or from a user with little internal system implementation knowledge, can relatively easily create and adapt the test cases and the test data as defined in the human readable file for testing evolving various new or existing system functionality, responsive to changes and additions in the system under test. In some embodiments, the authorized user can interact with a test user interface of a test master to generate, update and/or delete the test cases (as reflected in the test definition data) and the test data, instead of or in addition to directly operating with the underlying JSON file, XML file, flat file database, etc., that is used to represent the test cases and the test data. Example test data can be found in U.S. patent application Ser. No. 15/686,020, with an application title of "AUTOMATICALLY EXECUTING STATELESS TRANSACTIONS WITH DATA DEPENDENCY IN TEST CASES" by Tuhin Kanti Sharma, Michael Bartoli, Chris Tammariello, Ashish Patel, filed on Aug. 24, 2017, the entire contents of which are hereby incorporated by reference as if fully set forth herein.

Test agents can be deployed with any computing servers or computing nodes in a public cloud, in a private cloud, in a combination of one or more public clouds and one or more private clouds, and so forth. In some embodiments, the test master and the test agents may communicate over HTTP in a Representational State Transfer (REST) framework. In some possible embodiments, the only medium of communication between test master and test agents is through designed endpoints of web servers such as RESTful endpoints.

As used herein, the term "endpoint" refers to a designated communication point of a web server as described herein; web-client requests (e.g., from the test master, etc.) that cause test execution and retrieve final test execution statues and related test results are to be sent to such an endpoint. As used herein, the term "RESTful" refers to a type of method that allows communication between a web-based client (e.g., the test master, etc.) and a web-based server (e.g., any of the test agents, etc.) that employs REST constraints in accordance with the REST framework.

For example, the test master can send requests (e.g., HTTP requests, etc.) for executing the tests to the test agents by way of RESTful endpoints of web servers implemented by, or operating in conjunction with, the test agents.

The test master can transfer all its initial state (e.g., test data, test definition data, etc.) for a requested test over HTTP to a test agent in an HTTP-based REST request (or simply HTTP request) directed at a RESTful endpoint. In some embodiments, the test master can send up to an entire database dump in the HTTP-based REST request. In some embodiments, the test master can send some or all of the test definition data and the test data for test cases in the tests in a data description language or in a data interchange format such as JSON, XML, a flat file database format, etc., to the RESTful endpoint.

From test users' perspectives, the test master acts as a master server to test users. A test user may interact with the test master to create, update or delete tests, test cases for tests, test steps in each of the test cases, test data for test cases or test steps therein, test targets such as software and/or hardware components under test, and so forth. The test master can save the test definition data for the tests in a test data store. Additionally, optionally or alternatively, the test master can update some or all of the test agents with newly created test cases or updated test cases for test execution by the test agents. In some embodiments, any update to a test case that is currently being executed by a test agent may take effect at the test agent after the current execution of the test case is finished or otherwise aborted. Example test cases can be found in U.S. patent application Ser. No. 15/685,980, with an application title of "RUNTIME EXPANSION OF TEST CASES" by Ashish Patel, Tuhin Kanti Sharma, Chris Tammariello, Michael Bartoli, filed on Aug. 24, 2017, the entire contents of which are hereby incorporated by reference as if fully set forth herein.

In some embodiments, each of the test agents operates with, or implements, a (e.g., fully functional, etc.) web server. While executing a test, each of the test agents has its own state for the test and executes the requested test without sharing the test execution state with the test master.

The test master can issue a request for a test form any computing device by way of an HTTP request to a RESTful endpoint of the web server operated with or implemented by the test agent. If there is an outage on the test master for whatever reasons, and if the test master and the test agent are not able to communicate with each other, the test agent is fully capable of executing the test independently with the last known good state as indicated in the original received HTTP request that requested executing the test. After the test agent receives the initial state through the RESTful endpoint that request executing the test, the test agent is completely self-sufficient, and is able to update its own state for the test independently, etc., without any need for the test master (or any new test master) and without being impacted by any problem experienced by the test master.

In operational scenarios in which there is an outage on the test agent that has been requested for executing the test, either a new instance of the test agent can be brought up or the existing instance of the test agent can be restored. In both cases the test agent behaves transparently without getting affected by the previous outage. The test agent can obtain the latest known good state for the test from the test master. For instance, the test master can determine that the requested test was not properly completed or timed out. The test master may simply repeat the HTTP request to the RESTful endpoint for the test. As a result, the test agent and the test master do not have to exchange state information during the execution of the requested test and is stateless in this sense. This stateless test execution approach brings about many benefits including but not limited to: relatively high resiliency, relatively high independence, relatively high fault tolerance, relatively strong abilities for one or both of the test master and the test agents to take up different roles, etc.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2.0 FUNCTIONAL OVERVIEW

2.1 Test Tools and Proxy Agents

Figure 1:
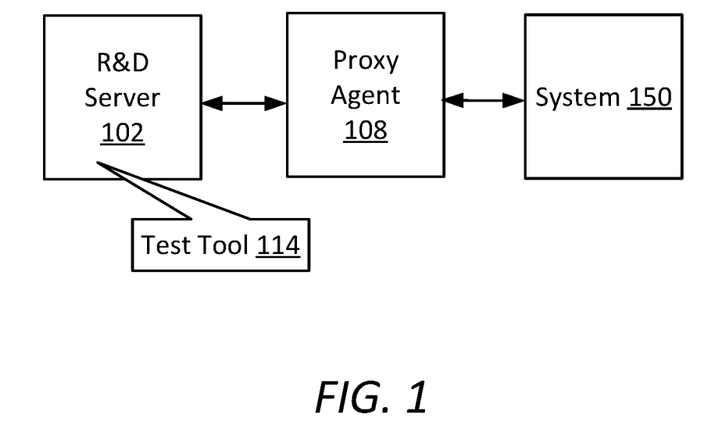
FIG. 1 illustrates an example test tool used to perform test cases against an example computing system.

FIG. 1 illustrates an example test tool 114 used to perform test cases against an example computing system 150.

As illustrated, test tool 114 is deployed at an R&D server 102 to execute test cases against system 150 under test. Test tool 114 can interact with a proxy agent 108 to execute the test cases against system 150. Test tool 114 may implement client-side test logic generated through simplifying production computer code actually implemented with user applications in system 150. Similarly, proxy agent 108 may implement server-side test logic or interface logic generated through simplifying production computer code actually implemented with service access layers of system 150. The server-side or interface logic in proxy agent 108 interacts with test tool 114 on one side and interacts directly or indirectly with system 150 on the other side.

The test cases to be executed by test tool 114 and proxy agent 108 may comprise test transactions and test interactions that simulate transactions and interactions supported by system 150.

In executing a test case, the client-side test logic implemented by test tool 114 interacts closely with the server-side test logic implemented by proxy agent 108 to guide the test case through relatively controlled test execution paths that purposefully exercise specific functionality or logic under test as supported or implemented by one or more software and/or hardware components in system 150.

For example, the client-side test logic requests proxy agent 108 to execute a first test step of interacting with system 150 to execute a specific application programming interface (API) call with specific test data. Proxy agent 108 in turn returns a status code and returned information from the API call after executing or attempting to execute the first test step. The client-side test logic of test tool 114 may analyze the status code and return information of the first test step, and request proxy agent 108 to execute a second test step of interacting with system 150 to execute a new specific application programming interface (API) call with new specific test data. Thus, in order to guide the test case through the predesignated test execution paths, test tool 114 and proxy agent 108 typically exchange and maintain significant amounts of test execution state information while the test case is being executed.

Both test tool 114 and proxy agent 108 are relatively tightly coupled with each other and further to production logic in system 150 in terms of design, implementation and runtime performance. When system 100 adds or changes features or logics, computer code implementing the client-side test logic in the test tool and computer code implementing the server-side test logic in the proxy agent need to be correspondingly modified, rewritten, created, interpreted, compiled, tested, installed, deployed, and so forth.

At runtime, test tool 114 operates with and depends on wellbeing of proxy agent 108 and other test execution counterparts such as computing nodes, network connections, databases, and so forth. If test tool 114, proxy agent 108, or any of the other test execution counterparts unexpectedly experiences a problem such as a system problem, an application specific problem, a network problem, a database problem, and so forth, as test tool 114 and proxy agent 108 may not be equipped to handle the problem, the test case may deviate from the predesignated test execution paths and thus fail to complete. Dependencies that exist among test tool 114, proxy agent 108 and other test execution counterparts also make it difficult and time consuming for test tool 114 and proxy agent 108 to recover from the failure and to repeat the test case until completion.

As test tool 114 and proxy agent 108 collectively maintain the test execution state information, relatively complex designs need to be implemented in test tool 114 and proxy agent 108. In addition, relatively heavy computations need to be performed at runtime to ensure that the test execution state information exchanged and maintained by test tool 114 and proxy agent 108 is semantically and/or syntactically correct. Given these issues, it is difficult to scale up capabilities of test tool 114 and proxy agent 108 to timely handle numerous test cases against a large number of software and hardware components in a large-scale or web-scale system (e.g., 100, etc.).

2.2 Stateless Text Execution Framework

Figure 2:
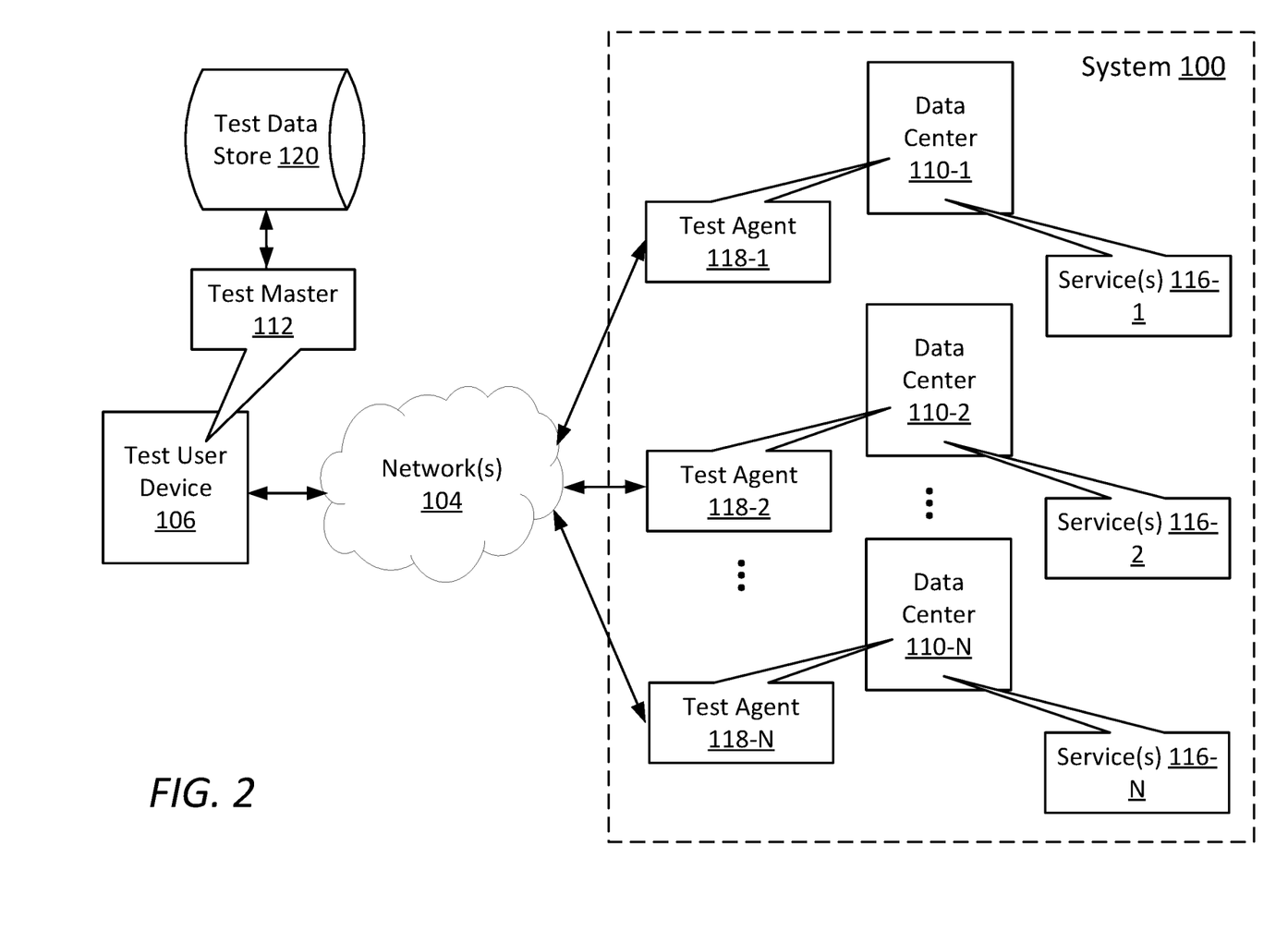
FIG. 2 illustrates an example stateless test execution framework comprising a test master and test agents.

FIG. 2 illustrates an example stateless test execution framework comprising a test master 112 and one or more test agents (e.g., 118-1, 118-2, 118-3, etc.). This framework can be used to run a wide variety of focused and/or extensive tests against software and/or hardware components in system 100. Example systems may include, but are not necessarily limited to: any of: multitenant data service systems, web-based systems, systems that support massive volumes of concurrent and/or sequential transactions and interactions, database systems, and so forth.

As illustrated in FIG. 2, system 100 may comprise one or more data centers 110-1, 110-2, . . . 110-N, where N is a positive integer. Data center 110-1 deploys first services 116-1; data center 110-2 deploys second services 116-2; data center 110-N deploys N-th services 116-N. Other software and/or hardware components, assets, and so forth, of system 100 may be hosted in or outside these data centers, and may serve as test target under techniques as described herein. As used herein, a service may refer to a service with an HTTP interface, or a service with a non-HTTP interface. Additionally, optionally or alternatively, services that serve as test targets under techniques as described herein may be deployed anywhere, not necessarily inside data centers. In some embodiments, a service (e.g., a HTTP based service, a non-HTTP based service, etc.) may span across multiple data centers. In some embodiments, instances (e.g., active, backup, etc.) of the same service may be deployed in different data centers for scalability and redundancy.

As used herein, the term "software components" may refer to one or more of: services with HTTP interfaces, services with non-HTTP interfaces, mobile applications, web-based applications, browser-based applications, user interfaces, plug-ins, APIs, operating systems, software libraries, computer executable codes, related non-executable data, application software, system software, embedded software, device drivers, microcode, computer clustering software, server processes, web servers, backend servers, database servers, databases, and so forth. The term "hardware components" may refer to one or more of: CPUs, controllers, microprocessors, FPGAs, ASICs, ICs, network processors, firmware, chipsets, interconnects, buses, RF integrated chips, graphic processors, computer memory, fixed and removable storage media, peripherals, and so forth.

Under techniques as described herein, test master 112 and test agents (e.g., 118-1, 118-2 . . . , 118-N, etc.) operate within a stateless framework that is agnostic to specific network setups. The one or more computer networks 104 through which test master 112 and test agents (e.g., 118-1, 118-2 . . . , 118-N, etc.) communicate may refer to any combination of one or more of: the Internet; intranets, extranets, virtual private networks (VPNs), local area networks (LANs), wide area networks (WANs), wireless networks, wireline networks, client-server, mobile networks, public networks, carrier-class networks, access networks, enterprise networks, proprietary networks, or the like.

Test master 112 can be deployed at a test user device 106, which represents a computer device that may or may not co-located with any of the test agents (e.g., 118-1, 118-2 . . . , 118-N, etc.). Example test user devices may include, but are not necessarily limited to only, any of: a computer server, a handheld computing device, a mobile device, a wearable device, a laptop computer, a work station, a desktop personal computer, a PDA, a cell phone, a tablet, a PC, or any device or any computing device capable of interfacing directly or indirectly to test agents as described herein for the purpose of running test cases against software and/or hardware components under test in system 100. In some embodiments, test master 112 may be deployed on any device which supports a JAVA virtual machine (JVM). Additionally, optionally or alternatively, test master 112 may be hosted on one or more server devices that host or provide one or more data repositories such as relational or non-relational databases for storing test related data. In some embodiments, test master 112 can be hosted on a web server and can be accessed through HTTP or REST endpoints.

The test agents (e.g., 118-1, 118-2 . . . , 118-N, etc.) can receive test execution requests from test master 112, and then execute tests as requested by the test execution requests in complete independence of test master 112. Final test statuses and related test results of the requested tests may be made available or sent to test master 112, for example, as responses to the test execution requests.

For example, to execute a specific test against specific software and/or hardware components under test in system 100, test master 112 retrieves test definition data and test data for the test from a test data store 120. Test master 112 can further identify a set of one or more candidate test agents that are configured to execute the test, for example based on agent configuration and status data retrieved from an accessible data store such as test data store 120. Example agent configuration and status data may include, but is not necessarily limited to only, any of: test capabilities of test agents in relation to the specific test, locations of test agents in relation to the specific test in relation to locations of the software and/or hardware components under test, etc.

Test master 112 can select any test agent in the set of candidate test agents to execute the test, and send a request for executing the test to the selected agent over one or more computer networks 104. The request for executing the test includes, but is not necessarily limited to only, any initial test data needed by the recipient test agent for scheduling and executing the test.

In response to receiving the request for executing the test, the test agent (e.g., 118-1, 118-2 . . . , 118-N, etc.) performs a series of operations to carry out the requested test. In some embodiments, the series of operation is performed by the test agent (e.g., 118-1, 118-2 . . . , 118-N, etc.) without further interactions between the test agent (e.g., 118-1, 118-2 . . . , 118-N, etc.) and test master 112 after the request for executing the test was received.

The series of operations performed by the test agent (e.g., 118-1, 118-2 . . . , 118-N, etc.) independently may include, but are not necessarily limited to only, one or more of: determining a set of test cases to be run in the test, determining a time schedule for executing each test case in the test, determining a complete set of test steps for each test case in the test, determining a complete set of test data used to initiate or execute the complete set of test steps for each such test case, executing the complete set of test steps for each such test case with the complete set of test data, generating a final test execution status for each such test case, causing the final test execution status and related test results for each such test case to be made available or returned to test master 112, and so forth.

Under the stateless test execution framework as described herein, once the request for the test is received by the test agent (e.g., 118-1, 118-2 . . . , 118-N, etc.), no coupling or interaction between the test agent (e.g., 118-1, 118-2 . . . , 118-N, etc.) and test master 112 is needed for the test agent (e.g., 118-1, 118-2 . . . , 118-N, etc.) to carry out executing the test. Even if test master 112 fails or otherwise becomes incommunicado with the test agent (e.g., 118-1, 118-2 . . . , 118-N, etc.), the test agent (e.g., 118-1, 118-2 . . . , 118-N, etc.) requested to perform the test can continue to schedule and execute all the test cases in the test, and carry out executing these test cases to their respective completions. In some embodiments, test master 112 does not poll for the final test execution status and the related test results; test agents autonomously post the final test execution status and the related test results (e.g., in a resource directory of a web server as described herein, etc.) for one or more test monitors to retrieve.

For the purpose of illustration only, FIG. 2 depicts a test agent for each data center. It should be noted, however, that in general, test agents may be deployed in same or different locations other than those implying a one-to-one relationship with data centers. In various embodiments, zero, one, or more test agents may be deployed at a data center. For example, a test agent pool comprising multiple test agents of similar capabilities may be deployed at a data center. Additionally, optionally or alternatively, another data center may be devoid of any locally deployed test agent. In some embodiments, a test agent at a data center may be used to test software and/or hardware components in system 100. In some embodiments, a test agent remote to a data center may be used to test software and/or hardware components in system 100. In some embodiments, test agents may be deployed at likely locations where potential users of system 100 are located so that functionality (or logic) and/or responsiveness can be tested with respect to certain software and/or hardware components in system 100.

2.3 RESTful Endpoints

Figure 3:
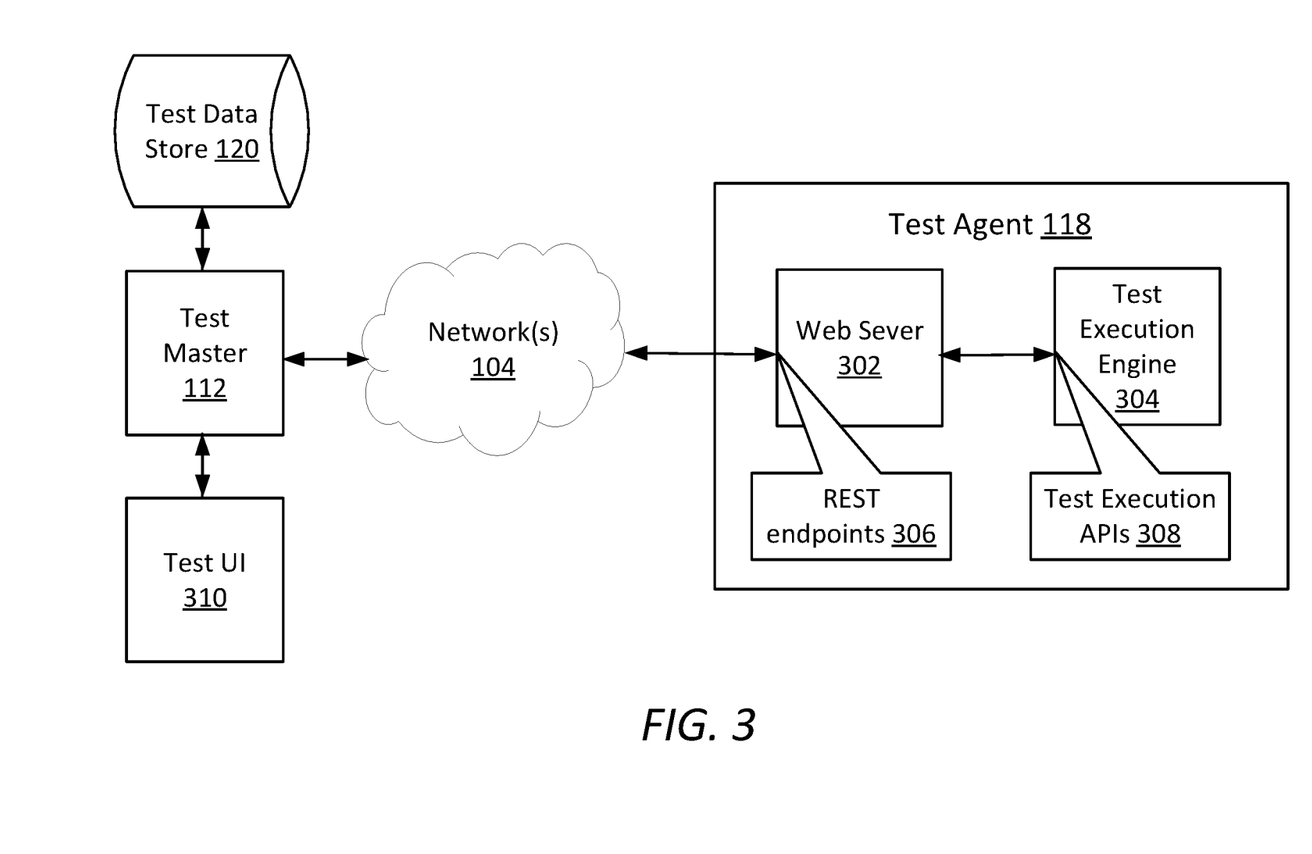
FIG. 3 illustrates an example test agent that interacts with test master for executing tests.

FIG. 3 illustrates an example test agent 118 that interacts with test master 112 for executing tests. As illustrated, test agent 118 comprises or implements a web server 302 and a test execution engine 304. Test execution engine 304 implements test execution functionality such as scheduling tests, executing tests, updating tests and test cases therein, reporting test execution statuses and results, and so forth. The test execution functionality implemented by the test execution engine 304 of test agent 118 may be exposed to web server 302 as one or more test execution Application Programming Interfaces (APIs) 308. Example test execution engines can be found in U.S. patent application Ser. No. 15/686,005, with an application title of "CONTROLLING EXECUTIONS OF SYNCHRONOUS AND/OR NON-SYNCHRONOUS OPERATIONS WITH ASYNCHRONOUS MESSAGES" by Ashish Patel, Chris Tammariello, Michael Bartoli, and Tuhin Kanti Sharma, filed on Aug. 24, 2017, the entire contents of which are hereby incorporated by reference as if fully set forth herein.

Test execution APIs 308 (e.g., implemented as HTTP-based RESTful APIs, etc.) exposed to web server 302 by test execution engine 304 may be indirectly exposed by web server 302 as HTTP-based endpoints/resources such as RESTful endpoints 306. These RESTful endpoints 306 are addressable by a web application or a web browser on any device directly or indirectly capable of establishing a web-based data connection with web server 302, including but not limited to: test master 112, another instance of test master 112 on a different device, and so forth.

Each of RESTful endpoints 306 may be addressable with an HTTP-based REST request including but not necessarily limited to only the following data items: a corresponding base Universal Resource Locator (URL) such as "https://txapi.force.com/resources/" that identifies a REST resources location for test execution; an internet media type that defines REST state transition data elements for test execution such as JSON, a XML file, a flat file database, and so forth; a standard HTTP method such as OPTIONS, GET, PUT, POST, and DELETE; etc.

In some embodiments, some or all of the RESTful endpoints may be publicly accessible. In some embodiments, some or all of the RESTful endpoints may be accessible by test master 112 through one or more private, proprietary, and/or specifically provisioned, data connections. In some embodiments, some or all of the RESTful endpoints may require authentication and/or authorization. One or more authentication and/or authorization mechanisms that can operate with HTTP or HTTP-based REST operations can be used before an API call can be successfully invoked indirectly by an HTTP request from test master 112 to web server 302. In some embodiments, some or all of the endpoints invoke API calls that execute tests accessing one or more of: test and/or production data owned by a service provider, test and/or production data owned by a user system of a service provider, data maintained at a specific data center or data store, data maintained at multiple data centers or data stores, and so forth.

At runtime, test master 112 may determine/select a RESTful (test execution) endpoint for scheduling a specific test to be executed by test agent 118. For instance, test master 112 may determine a set of data items to be included with an HTTP request such as the base URL of RESTful endpoints 306, a path (e.g., to be concatenated to the base URL, etc.) for the RESTful endpoint among the RESTful endpoints 306, REST state transition data elements (e.g., test definition data, test data, in JSON, in XML, in a flat file database format, etc.), a standard HTTP method of POST, and so forth.

Test master 112 generates an HTTP-based REST request based on a URL constructed from the base URL and the path, the REST state transition data elements (e.g., in JSON, in XML, in a flat file database format, etc.), the HTTP method, and so forth, and sends the HTTP-based REST request to web server 302 to cause web server 302 to invoke a call to a corresponding test execution API among test execution APIs 308 exposed to web server 302 by test execution engine 304.

In some embodiments, the HTTP-based REST request comprises test definition data that identifies the set of test cases, test steps in each test case in the set of test cases, test data to be used in each, some, or all of the test cases and/or the test steps in the test, and so forth. Some or all of the test definition data and the test data received as a part of the HTTP-based REST request from test master 112 may be passed to test execution engine 304.

The test may comprise a set of one or more test cases. For instance, a first test case in the test may be to execute one or more first test transactions and/or interactions with data center 110-1 of FIG. 2; a second test case in the test may be to execute one or more second test transactions and/or interactions with data center 110-2 of FIG. 2; a third test case in the test may be to execute one or more third test transactions and/or interactions with data center 110-1 of FIG. 2.

In response to invoking the specific API call by web server 302, test agent 118-1, or test execution engine 304 therein, performs a series of operations to schedule and/or carry out the requested test, as previously discussed. In some embodiments, the series of operation is performed by the test agent (e.g., 118-1, 118-2 . . . , 118-N, etc.) without further interactions between the test agent (e.g., 118-1, 118-2 . . . , 118-N, etc.) and test master 112.

In some embodiments, a final test execution status and some or all of test results from executing the set of test cases of the test may be provided by test execution engine 304 as return code or return data in the call of the corresponding test execution API to web server 302. Web server 302 may cache/store the final test execution status and some or all of the test results as REST resources that can be accessed or retrieved through HTTP-based REST GET operations from the REST resources location of web server 302. Some or all of the REST resources cached/stored by web server 302, including but not necessarily limited to only the final test execution status and the test results, may be returned in an HTTP-based REST response (or simply HTTP response) to test master 112 in response to the HTTP-based REST request for the test.

If test master 112 fails or otherwise becomes incommunicado with test agent 118, the HTTP-based REST response sent by test agent 118, or web server 302 operating in conjunction with test agent 118, may fail to reach test master 112. In some embodiments, a new instance or a recovered instance of test master 112 or another test master (e.g., from the same test user device, from a different test user device, etc.) may retrieve information from HTTP-based REST responses by querying the REST resources cached/stored by web server 302 with HTTP-based REST request with GET methods/operations.

For example, the test master 112, after being restored or restarted, can issue a new HTTP-based REST request to receive a new HTTP-based REST response that comprises information in the failed HTTP-based REST response. For instance, the new HTTP-based REST request may be generated based on the base URL of RESTful endpoints 306, the same path (e.g., to be concatenated to the base URL, etc.) for the specific RESTful endpoint among the RESTful endpoints 306 that was used to request executing the test, a standard HTTP method of GET, and so forth.

2.4 Test Definition Data and Test Data

In some embodiments, test execution engine 304 may be implemented with computer code that performs test transactions and test interactions based on the test definition data and the test data forwarded by web server 302 in the API call invoked by web server 302. Example test transactions and test interactions may include, but are not necessarily limited to only, any of: transactions and interactions using production data (e.g., actual data generated by users, etc.), transactions and interactions using test data (e.g., synthesized data to cover special or general data values or special or general application logic, etc.), transactions and interactions using software and hardware components in a production environment, transactions and interactions using software and hardware components in a development environment, transactions and interactions involving user input, transactions and interactions between backend servers, any combination of the foregoing, and so forth.

Test definition data and test data can be used to enable a test agent to execute a test independent of a test master while the test is being executed. For example, test execution engine 304 may be used to execute one or more test cases that comprise test transactions and test interactions that simulate transactions and interactions supported by user applications that run on user systems and that are used by users to access the subscribed services. Data representing user input in the test may be provided as a part of the test data originally in REST data elements (e.g., in JSON, in XML, in a flat file database format, etc.) and forwarded in the API call to test execution engine 304. The REST data elements as described herein can be used to include complete replications of view forms, which might be otherwise entered by a test user by hand under other approaches. Thus, based on the complete replications of the view forms (e.g., with synthesized data designed to test specific value range or specific logic of system 100, etc.), the test execution engine 304 can store the complete replication of the view forms in memory after the HTTP request causes a specific test execution API to be invoked (or called), and execute test steps without going back to test master 112 for additional user input for the view forms.

To simulate the transactions and interactions comprising dependency relationships, the test definition data may identify a set of dependent and/or independent test steps for each test case to be run in the test. The test definition data may identify specific relationships between and/or among the test steps in terms of timing, data, and other dependencies.

In executing a test case, based on the test definition data and the test data, test execution engine 304 guides the test case through relatively controlled test execution paths that purposefully exercise specific logic under test that is supported or implemented by one or more software and/or hardware components in system 100.

For example, test execution engine 304 may perform a first test step of a test case to interact with a set of specific software and/or hardware components under test in system 100 to execute a specific API call implemented or performed by the specific software and/or hardware component(s) under test with specific test data portions received in the test data or generated in prior dependent test steps (prior to the first step). The specific software and/or hardware components under test may return a status code and other related information in the specific API call. Test execution engine 304 may analyze the status code and return information, and perform a second test step of the test case to interact with a new set of specific software and/or hardware components under test in system 100 to execute a new specific application programming interface (API) call with new specific test data portions received in the test data or generated in prior dependent test steps (prior to the second step). Thus, while executing the test case, for the purpose of guiding the test case through the predesignated test execution paths, test execution engine 304 can maintain test execution state information in relation to the test case independent of test master 112.

2.5 Resiliency and Robustness

Under techniques as described herein, test master 112 does not have to be tied to any system under test in terms of design, implementation and runtime performance Test master 112 may be developed with generic software code agnostic to any system under test, so long as test master 112 implements generic logic of sending and receiving HTTP-based messages such as REST messages. Therefore, test master 112 may be used to test any in a wide variety of systems for which tests are specified/defined by test users.

In some embodiments, a test user can use test UI 310 to generate/create tests including test cases and test steps therein, configure the tests, etc. The test user may, but does not need to, write or edit tests directly in JSON, in XML, in a flat file database format, etc. The test user can interact with test UI 310 based on UI components such as view forms and UI-based data fields, and so forth to define test IDs, test case IDs, test step IDs, test data, and so forth. User provided view form parameters, data field values, data items, and so forth, through UI components of test UI 310 may be stored into test data store 120 to be accessed by test master 112.

For example, a test user may interact with test master 112 through a test user interface 310 to generate test definition data and test data for a test. The test definition data and the test data can be used to specify/define each test case in a set of one or more test cases in the test, all test steps in each test case in the set of test cases, test data used in each test case or each test step as described herein if any, and so forth. In some embodiments, instead of writing software code in a programming language (e.g., writing JAVA programs, etc.) that is closely coupled to or that is to mimic some functionality of a system under test, the test user can interact with test UI 310 for the purpose of generating and defining test cases represented by (e.g., solely, completely, substantially, etc.) the test definition data and test data in a data description language or in a data interchange format such as JSON, in XML, in a flat file database format, etc. The test definition data and test data can be included in a standard HTTP-based REST message/request without any software coding, and intelligently routed by test master 112 to a specific available test agent, based on some or all of agent configuration and status data, the test definition data, the test data and so forth. Thus, under techniques as described herein, tests, or test cases and test steps therein, can be created or executed without any need to write software code in a programming language such as JAVA, C#, C++, and so forth.

At runtime, test master 112 interacts with test agent 118 through RESTful endpoints. Test master 112 does not maintain any state information for a requested test once an HTTP request for the test is sent to a corresponding RESTful endpoint. While the test is being executed, test master 112 does not exchange any state information for the requested test with the test agent 118. Thus, test master 112 is agnostic to how the test is being executed, and is not affected by any problem influencing test agent 118 and the test execution.

As test master 112 and test agent 118 do not exchange test execution state information, and as test master 112 and test agent 118 communicate in a stateless framework through HTTP-based RESTful endpoints, test master 112 and test agent 118 are largely independent of each other, and are completely independent of each other during test execution. Thus, neither test master 112 nor test agent influences the other party during test execution. Any problem experienced by one of test master 112 and test agent 118 does not negatively impact the other of test master 112 and test agent 118. For instance, any problem experienced by test agent 118 such as a system problem, an application specific problem, a network problem, a database problem, and so forth, there is no impact to test master 112 beyond a test failure result of the requested test.

In some embodiments, agent configuration and status data in test data store 120 includes agent status data. The agent status data is not generated or updated by interactions (which is minimal, for example involving only sending a request to a RESTful endpoint and possibly receiving a response to the request at the end of requested test execution if test master 112 is still up) between test master 112 and test agents. Rather, the agent status data can be updated by system level process monitors, middleware, fault tolerant logic, high availability logic, and so forth, that are deployed in system 100. Example agent status data may include, but is necessarily limited to only, any of: runtime statuses of test agents (e.g., initiated, running normally, failed, etc.), process activities (e.g., no test results for a certain time period such as last two hours, etc.), test execution scheduling information (e.g., at what time a requested test is scheduled for execution, which test agent 118 is to execute a test, etc.), network topology information (e.g., where test agents are deployed, where data centers are located, etc.), test names or test case name, test metrics, final test execution statues, test results, time durations (e.g., for respective tests, test cases, test steps, etc.), and so forth.

In some embodiments, in response to determining, by test master 112, that test agent 118 has a problem in carrying out a requested test to completion, for example based on agent configuration and status data in test data store 120 accessible to test master 112, then test master 112 can intelligently select another test agent based on the agent configuration and status data for executing the test. As a result, test master 112 can handle a test agent problem relatively resiliently and efficiently.

As test master 112 and test agent 118 does not exchange and does not collaboratively maintain test execution state information during test execution, relatively uncomplicated design can be implemented in test master 112 and test agent 118, and relatively simple computations can be performed at runtime for executing tests. It may be relatively easy to scale capabilities of test master 112 and test agent 118 to execute a large number of test cases against numerous components in a large-scale or web-scale system (e.g., 100, etc.) in a timely fashion.

Under techniques as described herein, every test agent is self-sufficient. Test master 112 only distributes different tests to suitable test agents at suitable locations such as North America, Australia, Europe, South America, and so forth. Even though a test agent (e.g., 118, etc.) can maintain internal states such as those for test cases or test steps in the requested test, these internal states need not to be reported or shared with test master 112. Even without the test master, test agent 118 can run the requested test in entirety without needing any further from test master 112 and/or without any knowledge of a test master or a controller for the test agent to execute the test through pre-designated test execution paths. As soon as the test agent finishes executing the test and the final test execution status and related results are returned to be cached/saved as HTTP accessible resources, the test agent can even go down without in any way affecting the test master as far as the executed test is concerned.

In other words, the test agent can obtain the initial state from the test master for the requested test in a single HTTP request/message, execute the requested test in complete independence of the test master, and share the final test execution state and the related test results in REST resources, which can be returned to or queried by the test master or by a new or recovered instance of the test master even if the test master fails (or dies) after sending the HTTP request/message.

Example tests as described herein may include, but are not necessarily limited to only, those related to any of: production system functionality, system functionality in various stages of development and/or test phases, functionality related to user experiences, checking login pool, orchestration of multiple services, accesses to multiple data centers and/or data stores, system or service health checks, ping checks, transactions, account creation, reporting software, results analysis, alerting, visualization, multi-step tests, data creation tests, data deletion tests, data entry tests, complicated and/or uncomplicated transactions, services exposed to user systems, internal services not exposed to user systems, HTTP-based operations, UI related functionality, web-based accesses, SMTP-based operations, FTP-based operations, network functionality, real-time operations, near-real-time operations, non-real-time operations, and so forth.

In some embodiments, final test execution statuses and some or all of related test results of tests, as received by test master 112 in HTTP responses including but not limited to HTTP responses to original HTTP requests that request executing the tests or to subsequent HTTP request that retrieves REST resources created from return codes and return data of API calls to test execution engines of the test agents, can be aggregated and/or presented/visualized (e.g., in standard formats, etc.) to one or more test users through the test UI 310.

In this stateless test execution framework, test master 112 and test agent 118 may have their own respective data repositories. For instance, test master 112 can access test data store 120 for test definition data, test data, final test execution statuses, and related test results obtained through HTTP communications with web server 302 operating in conjunction with, or implemented by, test agent 118. A test user can interact with test master 112 to generate, update/edit, delete, and/or retrieve some or all of the information maintained in test data store 120.

Test agent 118 can access its own data store (not shown) in memory or in storage media accessible to test agent 118. Test agent 118 may use its own data store to store test definition data (e.g., unique test IDs for respective tests, unique test case IDs for respective test cases, unique test step IDs for respective test steps in a test case, etc.) and test data received from test master 112 by way of API calls invoked by web server 302 in response to HTTP-based REST request. Test agent 118 can also use its own data store to store intermediate states during a test case or step execution. A final test execution status of a test, which may include separate statues for each test cases and/or each test step in the test, may be cached/stored by test agent 118 in its own store and provided by test agent 118 to web server 302, which in turn maintain/store the final test execution status and some or all of related test results as REST resources retrievable through HTTP-based REST GET operations by a web client such as test master 112 and so forth.

In some embodiments, test master 112 can pass up to an entire database dump in an HTTP request (e.g., an HTTP-based REST POST method/operation, etc.) for executing a test. For example, data stored in relational database tables, in objects, in a file-based database, etc., can be duplicated (e.g., via key-value pairs, via data/object/file serialization, etc.) through REST data elements included as a part of the HTTP request in a data interchange format such as JSON, in XML, in a flat file database format, etc. Additionally, optionally or alternatively, database scripts may be sent through the REST data elements to be used to create some or all of the test data needed by test agent 118.

In some embodiments, each test may be identified by or assigned with a unique test ID to distinguish the test from all other tests. Similarly, each test case in a test may be identified by or assigned with a unique test case ID to distinguish the test case from all other test cases, regardless of which test includes any of these test cases. Additionally, optionally or alternatively, each test step in a test case may be identified by or assigned with a unique test step ID to distinguish the test step from all other test cases, for example in the test case.

As test agents as described herein provide final test execution statuses and related test results as REST resources of web servers associated with the test agents, test master 112 can query the REST resources using HTTP-based REST GET methods/operations to obtain a most up-to-date version of the final test execution statuses and the related test results. Test master 112 therefore can obtain the last state of all test execution based on this information. Based on this information from web servers and agent configuration and status data accessible to test master 112, without exchanging any test execution state information with any of the test agents, test master 112 can determine whether any tests should be routed to specific test agents, routed away from specific test agents, etc. For instance, if a test executed by a test agent located in a South America data center need to be routed to a different test agent because of a failure affecting the test agent, test master 112 may select another test agent from a set of available test agents deployed at or near the South America data center to execute the test, so that response times and conditions experienced by the different test agent in executing the test may be comparable with what would be experienced by the failed test agent. Further, based on test definition data and test data accessible to test master 112, without exchanging any test execution state information with any of the test agents, test master 112 can determine what data items are to be provided to selected test agents for executing or repeating tests. As a result, test master 112 can work resiliently and efficiently in carrying out tests.

Similarly, since a test agent has its own data store and tracks its own test agent without any need for direction or guidance from a test master during executing a test, the test agent can operate normally, regardless of what current conditions may be affecting the test master. The test agent is able to execute or continue executing a test from its last known state. While executing the test, the test agent can cache/save intermediate states and need not to query test master 112 to determine next test step, next test case, test step dependency information, test data, predesignated test execution flow and so forth. Furthermore, a final test execution result and related test results can be returned to an associated web server and can be stored by the web server as REST resources, regardless of what current conditions may be affecting the test master. As a result, the test agent can also work resiliently and efficiently in carrying out tests.

Test master 112 can maintain the latest state for all tests that need to be executed by test agents. After the test user updates any test including but not limited to test cases and/or test steps therein, test master 112 can send an HTTP-based REST request to a test agent for executing the updated test. If the updated test has the same test ID as a current test being executed by the test agent, or if an updated test case has the same test case ID as a current test case being executed by the test agent, executing the updated test or the updated test case may be deferred after the current test or the current test case is completed by the test agent.

3.0 EXAMPLE EMBODIMENTS

Figure 4A:
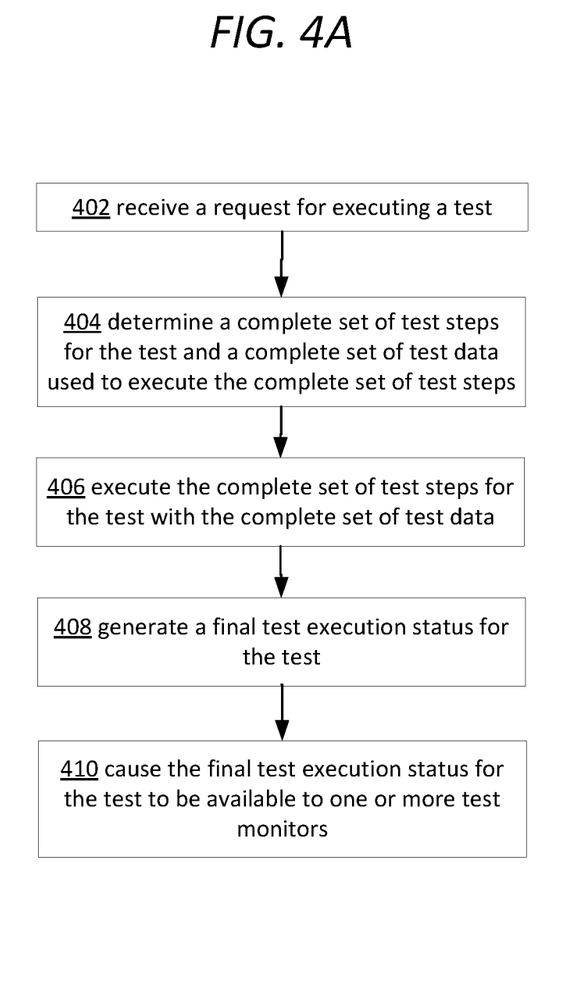
FIG. 4A and FIG. 4B illustrate example process flows.

FIG. 4A illustrates an example process flow that may be implemented by a computing system (or device) as described herein. In block 402, a web server (e.g., 302 of FIG. 3, etc.) operating with a test agent (e.g., 118 of FIG. 3, 118-1 through 118-N of FIG. 2, etc.) receives a request for executing a test. The request is sent by a test master to an endpoint of the web server. In response to receiving the request by the web server, without exchanging information between the test agent and the test master, the test agent performs a series of operations.

In block 404, the test agent determines a complete set of test steps for the test and a complete set of test data used to execute the complete set of test steps.

In block 406, the test agent executes the complete set of test steps for the test with the complete set of test data.

In block 408, the test agent generates a final test execution status for the test.

In block 410, the test agent causes the final test execution status for the test to be available for one or more test monitors to retrieve by way of the web server.

In an embodiment, the endpoint of the web server represents a Hypertext Transfer Protocol (HTTP) endpoint. In an embodiment, the test master communicates with the test agent by way of the web server in a Representational State Transfer (REST) framework; the endpoint of the web server represents a HTTP-based RESTful endpoint.

In an embodiment, the request for executing the test comprises: a Universal Resource Locator (URL), one or more Representational State Transfer (REST) data elements, a standard Hypertext Transfer Protocol (HTTP) method, etc. In an embodiment, the standard HTTP method represents one of: an HTTP POST method, an HTTP PUT method, and so forth.

In an embodiment, the final test execution status for the test is sent to the test master in one of: a response to the request for executing the test; a response to a subsequent request sent by the test master based on one of an HTTP GET method, an HTTP LIST method, or the like; etc.

In an embodiment, the request for executing the test causes the web server to invoke an Application Programming Interface (API) call exposed by a test execution engine of the test agent; the test execution engine is to schedule and carry out executing the test.

In an embodiment, the web server is implemented as a part of the test agent.

Figure 4B:
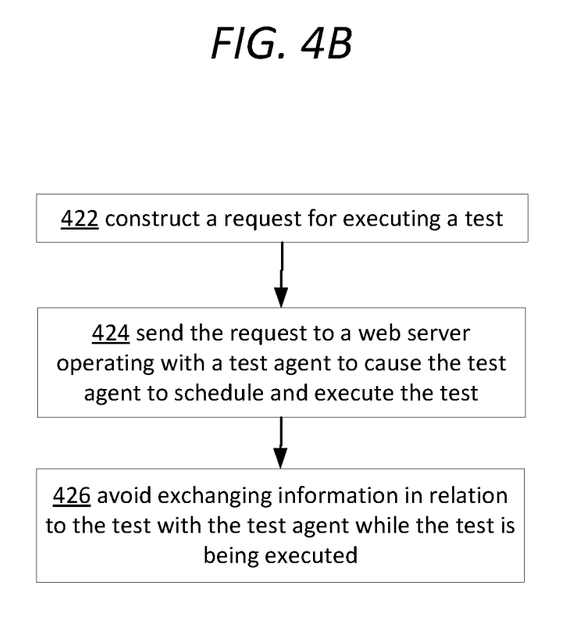

FIG. 4B illustrates an example process flow that may be implemented by a computing system (or device) as described herein. In block 422, a test master (e.g., 112 of FIG. 2 or FIG. 3, etc.) constructs a request for executing a test. The request includes test definition data and test data.

In block 424, the test master sends the request for executing the test to a web server operating with a test agent to cause the test agent to schedule and execute the test. The request is received by the web server at an endpoint of the web server.

In block 426, the test master avoids exchanging information in relation to the test with the test agent while the test is being executed. In an embodiment, one or more test monitors receive, by way of the web server from the test agent, the final test execution status for the test.

In an embodiment, the test agent is selected, based on agent configuration and status data, among a set of candidate test agents configured to execute the test.

In an embodiment, the test definition data and test data is represented in a data interchange format.

In an embodiment, the data interchange format represents one of: a Javascript Object Notation (JSON) format, an XML format, a flat file database format, and so forth.

In an embodiment, the test master is further configured to perform: determining, based on agent configuration and status data, that the test agent fails to execute the test; selecting, based on the agent configuration and status data, a second test agent among a set of candidate test agents configured to execute the test; constructing a second request for executing the test, the request including a latest version of the test definition data and the test data; sending the second request for executing the test to a second web server operating with the second test agent to cause the second test agent to schedule and execute the test, the request being received by the second web server at an endpoint of the second web server; etc.

In an embodiment, the test master is further configured to perform: subsequent to the test master restarting, sending, by the test master, a request for retrieving a final test execution status of the test to the endpoint of the web server; receiving, by the test master from the web server, the final test execution status of the test from a response to the request; etc.

In an embodiment, the test master is further configured to perform: interacting with a test user to generate the test definition data and the test data.

In an embodiment, the test data comprises view form user input to be used by the test agent to complete executing the test without interacting with the test master while executing the test.

In some embodiments, process flows involving operations, methods, etc., as described herein can be performed through one or more computing devices or units.

In an embodiment, an apparatus comprises a processor and is configured to perform any of these operations, methods, process flows, etc.

In an embodiment, a non-transitory computer readable storage medium, storing software instructions, which when executed by one or more processors cause performance of any of these operations, methods, process flows, etc.

In an embodiment, a computing device comprising one or more processors and one or more storage media storing a set of instructions which, when executed by the one or more processors, cause performance of any of these operations, methods, process flows, etc. Note that, although separate embodiments are discussed herein, any combination of embodiments and/or partial embodiments discussed herein may be combined to form further embodiments.

4.0 IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
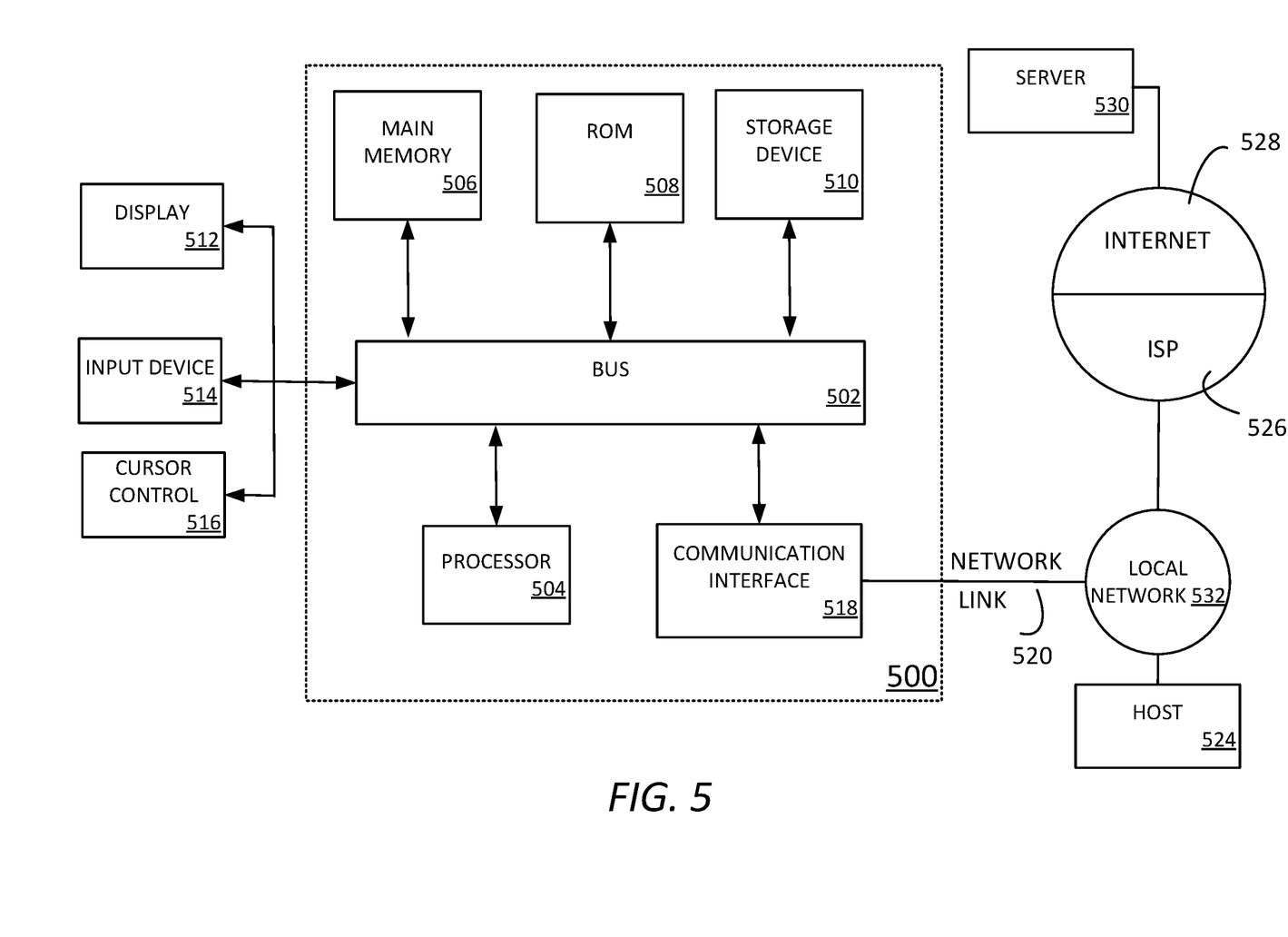
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

5.0 EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method performed by a test master, wherein the test master is implemented with one or more computing devices, the method comprising:
   constructing a request for executing a test against a set of software and hardware components located in one or more data centers separate from the test master, a web server, and a test agent, wherein the request includes test definition data and test data;
   sending, to the test agent by way of the web server operating with the test agent, the request for executing the test against the set of software and hardware components located in the one or more data centers separate from the test master, the web server, and the test agent, wherein the request is sent by the test master to an endpoint of the web server;
   causing the test agent, in response to receiving the request by the web server without exchanging further information between the test agent and the test master, to:
   (a) determine a complete set of test steps for the test against the set of software and hardware components and a complete set of test data used to execute the complete set of test steps,
   (b) execute the complete set of test steps for the test against the set of software and hardware components with the complete set of test data, wherein the complete set of test steps simulates one or more test transactions with user interactions,
   (c) generate a final test execution status for the test against the set of software and hardware components, and
   (d) make the final test execution status for the test available for one or more test monitors to retrieve by way of the web server;
   wherein the final test execution status for the test indicates whether the test has been successfully executed by the test agent.

2. The method as recited in claim 1, wherein the endpoint of the web server represents a Hypertext Transfer Protocol (HTTP) endpoint.

3. The method as recited in claim 1, wherein the request for executing the test comprises: a Universal Resource Locator (URL), one or more Representational State Transfer (REST) data elements, and a standard Hypertext Transfer Protocol (HTTP) method.

4. The method as recited in claim 1, wherein the final test execution status for the test is sent to the test master in one of: a response to the request for executing the test, or a response to a subsequent request sent by the test master based on one of an HTTP GET method or an HTTP LIST method.

5. The method as recited in claim 1, wherein the test agent is selected, based on agent configuration and status data, among a set of candidate test agents configured to execute the test.

6. The method as recited in claim 1, wherein the test definition data and test data is represented in a data interchange format.

7. The method as recited in claim 6, wherein the data interchange format represents one of: a Javascript Object Notation (JSON) format, an XML format, or a flat file database format.

8. One or more non-transitory computer readable media storing a program of instructions that is executable by a test master implemented with one or more computing devices to perform:
constructing a request for executing a test against a set of software and hardware components located in one or more data centers separate from the test master, a web server, and a test agent, wherein the request includes test definition data and test data;
sending, to the test agent by way of the web server operating with the test agent, the request for executing the test against the set of software and hardware components located in the one or more data centers separate from the test master, the web server, and the test agent, wherein the request is sent by the test master to an endpoint of the web server;
causing the test agent, in response to receiving the request by the web server without exchanging further information between the test agent and the test master, to:
(a) determine a complete set of test steps for the test against the set of software and hardware components and a complete set of test data used to execute the complete set of test steps,
(b) execute the complete set of test steps for the test against the set of software and hardware components with the complete set of test data, wherein the complete set of test steps simulates one or more test transactions with user interactions,
(c) generate a final test execution status for the test against the set of software and hardware components, and
(d) make the final test execution status for the test available for one or more test monitors to retrieve by way of the web server;
wherein the final test execution status for the test indicates whether the test has been successfully executed by the test agent.

9. The medium as recited in claim 8, wherein the endpoint of the web server represents a Hypertext Transfer Protocol (HTTP) endpoint.

10. The medium as recited in claim 8, wherein the request for executing the test comprises: a Universal Resource Locator (URL), one or more Representational State Transfer (REST) data elements, and a standard Hypertext Transfer Protocol (HTTP) method.

11. The medium as recited in claim 8, wherein the final test execution status for the test is sent to the test master in one of: a response to the request for executing the test, or a response to a subsequent request sent by the test master based on one of an HTTP GET method or an HTTP LIST method.

12. The medium as recited in claim 8, wherein the test agent is selected, based on agent configuration and status data, among a set of candidate test agents configured to execute the test.

13. The medium as recited in claim 8, wherein the test definition data and test data is represented in a data interchange format.

14. A system, comprising:
one or more computing processors;
one or more non-transitory computer readable media storing a program of instructions that is executable by a test master implemented with the one or more computing processors to perform:
constructing a request for executing a test against a set of software and hardware components located in one or more data centers separate from the test master, a web server, and a test agent, wherein the request includes test definition data and test data;
sending, to the test agent by way of the web server operating with the test agent, the request for executing the test against the set of software and hardware components located in the one or more data centers separate from the test master, the web server, and the test agent, wherein the request is sent by the test master to an endpoint of the web server;
causing the test agent, in response to receiving the request by the web server without exchanging further information between the test agent and the test master, to:
(a) determine a complete set of test steps for the test against the set of software and hardware components and a complete set of test data used to execute the complete set of test steps,
(b) execute the complete set of test steps for the test against the set of software and hardware components with the complete set of test data, wherein the complete set of test steps simulates one or more test transactions with user interactions,
(c) generate a final test execution status for the test against the set of software and hardware components, and
(d) make the final test execution status for the test available for one or more test monitors to retrieve by way of the web server;
wherein the final test execution status for the test indicates whether the test has been successfully executed by the test agent.

15. The system as recited in claim 14, wherein the endpoint of the web server represents a Hypertext Transfer Protocol (HTTP) endpoint.

16. The system as recited in claim 14, wherein the request for executing the test comprises: a Universal Resource Locator (URL), one or more Representational State Transfer (REST) data elements, and a standard Hypertext Transfer Protocol (HTTP) method.

17. The system as recited in claim 14, wherein the final test execution status for the test is sent to the test master in one of: a response to the request for executing the test, or a response to a subsequent request sent by the test master based on one of an HTTP GET method or an HTTP LIST method.

18. The system as recited in claim 14, wherein the test agent is selected, based on agent configuration and status data, among a set of candidate test agents configured to execute the test.

19. The system as recited in claim 14, wherein the test definition data and test data is represented in a data interchange format.

20. The system as recited in claim 19, wherein the data interchange format represents one of: a Javascript Object Notation (JSON) format, an XML format, or a flat file database format.

\* \* \* \* \*